United States Patent Office 3,439,398
Patented Apr. 22, 1969

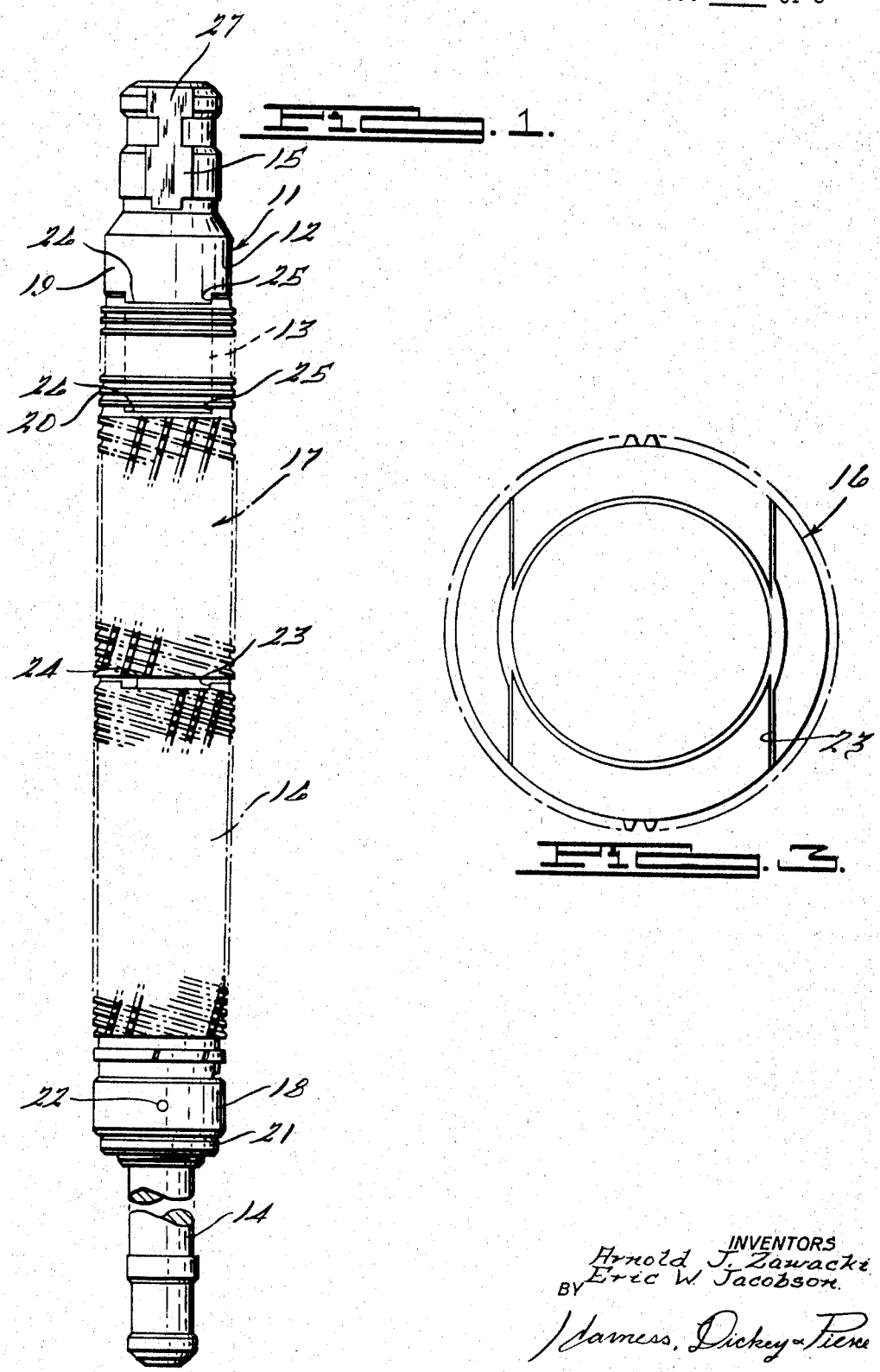

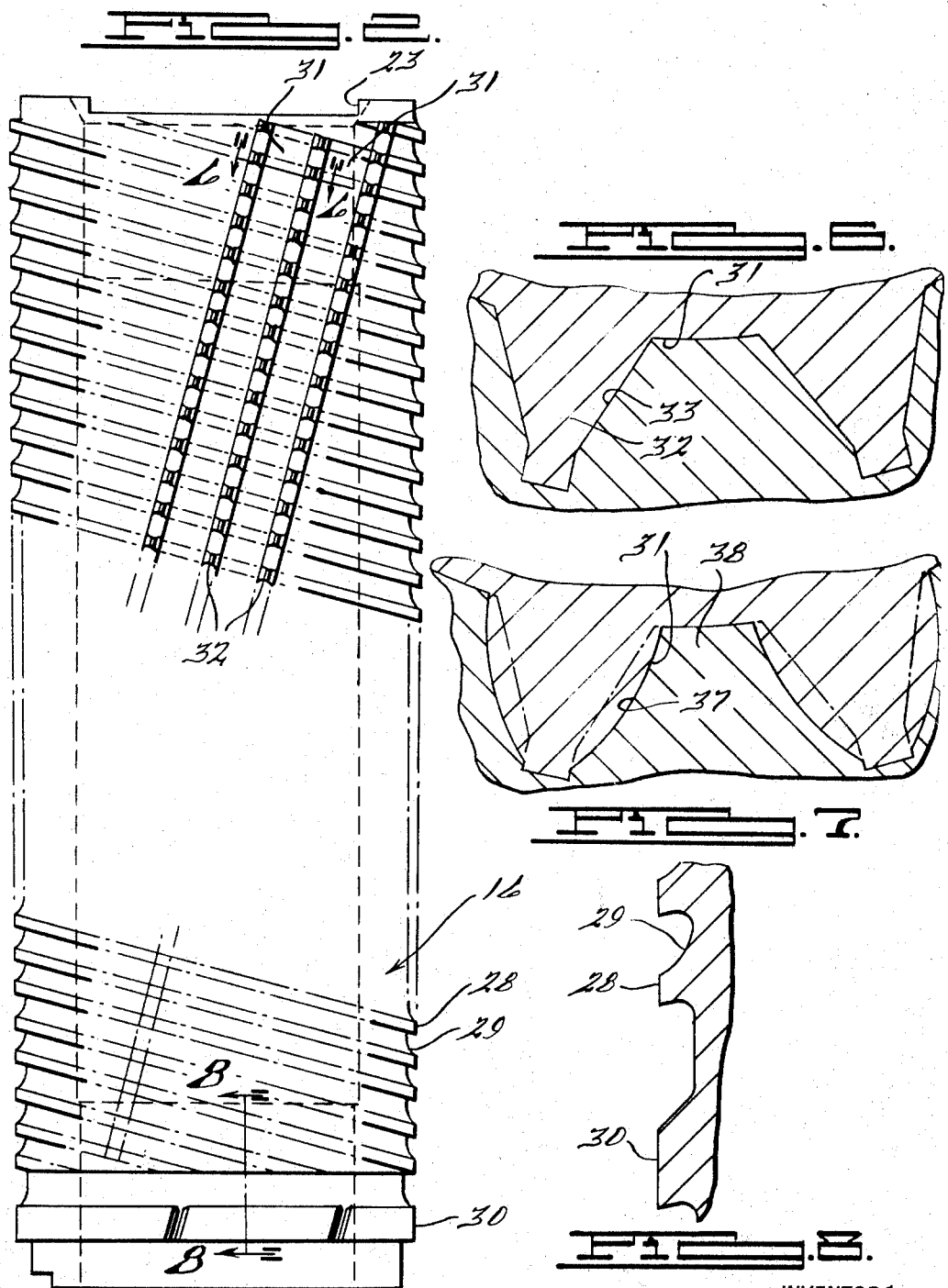

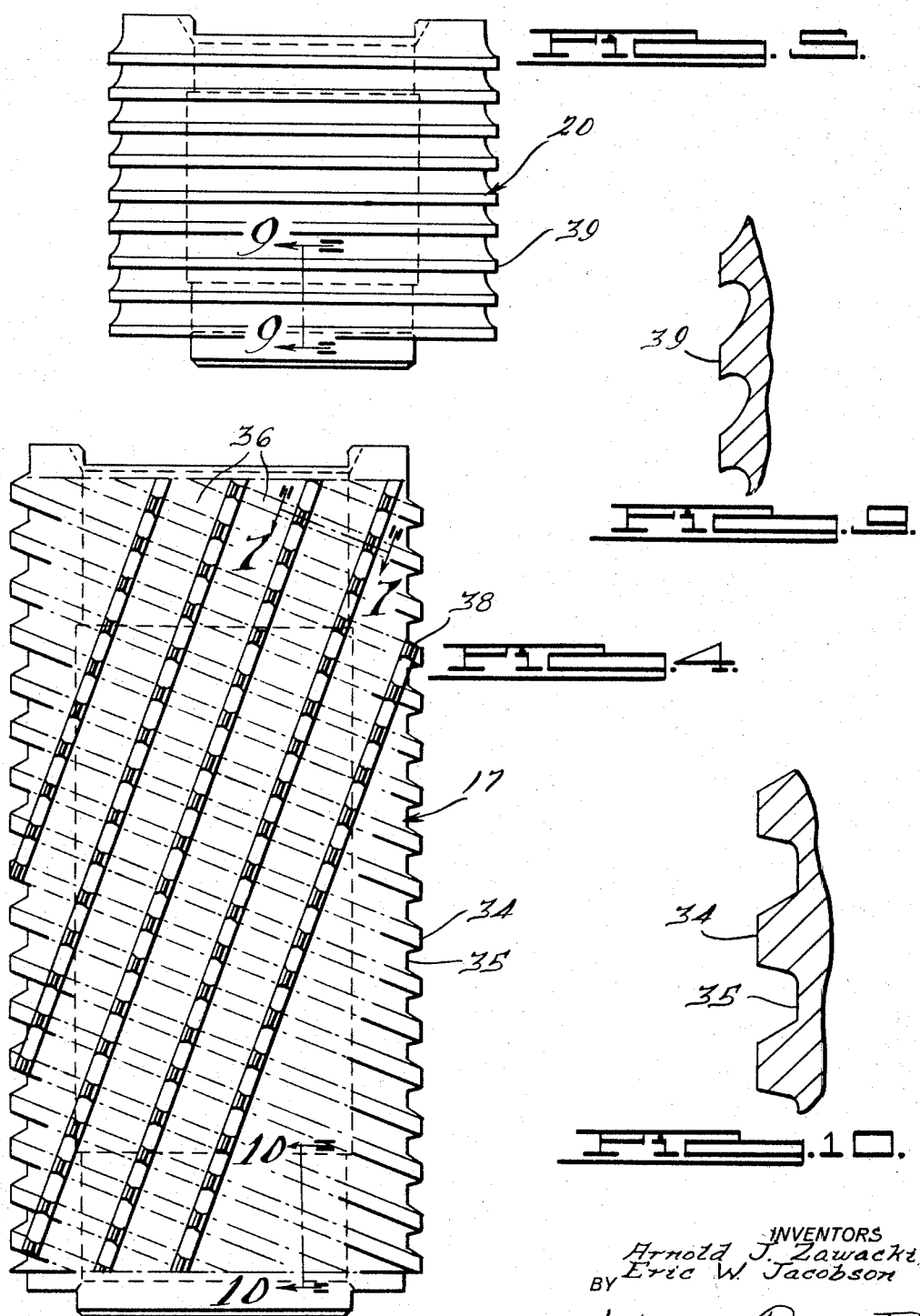

3,439,398
HELICALLY NICKED BROACH
Arnold J. Zawacki, Detroit, and Eric W. Jacobson, Birmingham, Mich., assignors to Colonial Broach & Machine Company, Warren, Mich., a corporation of Delaware
Filed Feb. 23, 1966, Ser. No. 529,493
Int. Cl. B23p *15/42;* B26d *1/04*
U.S. Cl. 29—95.1                                                      1 Claim

ABSTRACT OF THE DISCLOSURE

A cylindrical broach for cutting helical splines on the interior of a hollow annular workpiece and having a first portion with helical rows of cutting teeth having a substantially constant width but of increasing height from the front end to the rear end of the first portion, and a second portion with helical rows of cutting teeth of substantially constant height but of increasing width from the front end to the rear end of the second portion. The body of the broach has means for turning the broach on the helix angle of the teeth when the broach is advanced through the workpiece.

---

This invention relates to broaches and particularly to a broach of the helical type having teeth cut in lands at a complementary helical angle but of the opposite hand to have the faces of the teeth disposed at right angles to the length thereof.

Broaches having helical teeth have been made heretofore with a front roughing section which progressively cut grooves to depth with a following section having side cutting teeth which widen the grooves while shaping the sides to a desired form. No problem was presented for producing a spur type of tooth since the teeth were cut from lands which were produced by grooves located normal to the axis of the broach body. Difficulty was experienced when helical teeth were provided since the face of the teeth were not located at right angles to their length and formed with the sides an acute and obtuse angle which tends to cut more readily on one side, causing a drift from the true helical path.

The present invention solves this problem by forming a land as a thread on a left-hand helix angle of the same degree as that of the teeth which are cut in the land on the opposite or right-hand helix angle. As a result, the face of the teeth will be normal to their length and when the side edges are similarly relieved the angles at each side cutting edge will be the same and will produce the same degree of cut.

The broach has a body with the teeth thereon or which supports roughing and finishing shells which are accurately locked together so that the roughing and finished teeth will be aligned and will follow the same helical angle. Each broach section or shell is separately machined, the roughing section or shell having teeth thereon which become progressively higher from the front to the rear while the finishing section or shell has teeth thereon of the same height but increasing width from the front to the rear. It is to be understood that the broach teeth may be of involute or like form for producing involute or like grooves or splines in a ring for a spline engagement with a shaft having teeth of the same shape as the finishing teeth of the broach. When involute teeth are employed on the broach, a ring gear will be produced upon which a pinion may also operate.

Accordingly, the main objects of the invention are: to provide a broach with helical teeth the faces of which are disposed normal to the length thereof; to form a thread-like land on a broach body or shell at a complementary helix angle to that of the helix angle of the teeth 90° apart so as to have the face of the teeth disposed at right angles to the length thereof; to provide a body for a broach on which a roughing and finishing shell are mounted with the shells interlocked to have the teeth of the shells disposed in exact aligned relation to each other, and in general, to provide a broach of the helical type which is simple in construction, positive in operation, economical of manufacture.

Other objects and features of novelty of the invention will be specifically pointed out or will become apparent when referring, for a better understanding of the invention, to the following description taken in conjunction with the accompanying drawings, wherein:

FIG. 1 is a view in elevation of a pull type broach having a body supporting a plurality of sections embodying features of the present invention;

FIG. 2 is an enlarged broken view in elevation of a roughing shell having helical teeth thereon of increasing height;

FIG. 3 is an end view of the structure illustrated in FIG. 2;

FIG. 4 is an enlarged view in elevation of a finishing shell having helical teeth thereon of the same height but of increasing width;

FIG. 5 is a view in elevation of a shell for finishing the cylindrical interior of the workpiece;

FIG. 6 is an enlarged sectional view of the teeth of the shell illustrated in FIG. 2, taken on the line 6—6 thereof and a workpiece section having grooves cut therein;

FIG. 7 is an enlarged sectional view of the teeth of the shell illustrated in FIG. 4, taken on the line 7—7 thereof and a workpiece section having grooves cut therein;

FIG. 8 is an enlarged broken sectional view of the structure illustrated in FIG. 6, taken on the line 8—8 thereof;

FIG. 9 is an enlarged broken sectional view of the structure illustrated in FIG. 5, taken on the line 9—9 thereof; and FIG. 10 is an enlarged broken sectional view of the structure illustrated in FIG. 4, taken on the line 10—10 thereof.

While the broach of the present invention may be machined as a unit from solid stock, the one herein illustrated is of large size and made of a plurality of sections. The broach 11 has an arbor 12 embodying a central cylindrical portion 13, a pull end 14 and a lift and turning end 15. A helical toothed roughing shell 16, a helical toothed side forming shell 17 and an internal diameter finishing shell 20 are supported on the cylindrical portion 13 of the arbor. A front pilot ring 18 is threaded on the arbor to clamp the shells 16, 17 and 20 together against a large head 19 at the lift end of the broach. The ring 18 is locked in position by the threaded locking ring 21. Four apertures 22 are provided in each ring 18 and 21 for engagement by a spanner wrench.

The shell 16 has a cross slot 23 in the end adjacent to the shell 17 and the adjacent portion of the shell 17 is provided with tangs 24, which extend within the slots 23. The tangs and slots are shifted to one side of the center line so that they can move into engagement in only one position on the cylindrical body 13. The opposite end of the shell 17 has a similar slot 25 and the shell 20 has similar tangs 26 disposed on the center line the same as the slots 25 and tangs 26 on the upper end of the finishing shell 20 and the head 19 to prevent any relative rotation therebetween. The lift end 15 has flat areas 27 on opposite sides for engagement by a lift chuck which is turned by a lead screw of the machine to turn the broach on the lead of the teeth thereof.

The shell 16 is tapered from one to the other end, the one herein illustrated by way of example, being tapered from 4.34″ in diameter to 4.61″. The thread-like land 28 from which the teeth are cut is formed by a groove 29 which is cut on a helix angle disposed 90° from the helix of the teeth. If the teeth are cut on a 21° right-hand helix angle, then the groove 29 would be cut on a 21° left-hand helix angle, and the land 28 would be a continuous thread as on a lead screw. After the land 28 is formed in this manner, the helical splines 31 are formed therein on a complementary helix angle, 90° from the groove 29, to the same depth so that teeth 32 are formed which increase in height due to the taper of the outer diameter of the land 28 from the front to the rear end of the section. In this manner the teeth 32 progressively cut a slot 33 in the workpiece ring to depth, as illustrated in FIG. 6. With this arrangement the front face of each tooth 32 is disposed perpendicular to the length of the tooth so that the cutting edge on each side, after being backed off or relieved, will have the same angle and will produce the same cut on each side as the depth of the slots is increased. The depth of a cut is slightly greater than the depth of the cut produced by the side cutting finishing teeth of the shell 17.

The shell 17 has a thread-like land 34 formed by a continuous groove 35 on a lead angle 90° from the lead angle of the helical splines 36 forming the cutting grooves in the land 34. The diameter of the land 34 is the same at both ends and the depth of the grooves for the broach herein illustrated being substantially 4.60″, .01″ less than the splines 31 cut by the adjacent end of the shell 16. The splines 36 progressively become wider from the front to the rear end of the shell and in the present instance are in the shape of an involute, as illustrated in FIG. 7, to cut helical involute slots 37 inwardly of the inner face of a ring 38 being broached. This provides involute splines in the ring for spline engagement with involute teeth on a shaft or teeth upon which a pinion may operate.

The walls of the teeth 38 are backed off or relieved from the cutting edge in the normal manner. In the central portion of the shell the relief starts rearwardly of a narrower land surface, the land portion being increased in width toward the end of the shell. When sharpening occurs the dimension of the slot 37 cut thereby is not affected until all of the land portions have been cut away by the various sharpening operations.

The shell 20 is of conventional form having each annular cutting tooth 39 increasing in diameter from the front to the rear with the last series of teeth having increased land areas from which relief occurs so that upon sharpening the finishing diameter will remain the same. The teeth 39 finish the interior of the ring to an accurate internal diameter.

What is claimed is:

1. In a cylindrical broach for cutting helical splines in the inner face of a hollow annular workpiece, an elongated body in the form of an arbor having a pulling end, a lifting end and a cylindrical body therebetween, said cylindrical body having a first hollow shell portion mounted therearound provided with helical rows of substantially constant width cutting teeth of increasing height from the front to the rear for cutting helical splines in said workpiece by progressively increasing the splines in depth, and a second hollow shell portion following said first hollow shell portion and having helical rows of substantial constant height cutting teeth of increasing width for cutting said splines progressively in width, the teeth of said first and second hollow shell portions being cut in a thread-like land disposed substantially 90° to the helix angle of the rows of teeth and the faces of the teeth of both said first and second portions being disposed substantially normal to the length of said teeth, a third hollow shell portion having parallel annular continuous cutting teeth of increasing height for cutting the internal diameter of the workpiece, and a tang and slot connection between said first, second and third hollow shell sections and between said arbor and said first hollow shell section for preventing relative rotation therebetween while aligning the teeth of one shell with those of the other when in assembled relation, wherein said rear lifting end of said arbor is of cylindrical form having an annular recess and flat faces on the sides by which the broach is turned on the helix angle of the teeth when advanced through the workpiece.

References Cited

UNITED STATES PATENTS

| 2,011,630 | 8/1935 | Halborg | 29—95.1 |
| 2,060,889 | 11/1936 | Nilsson | 29—95.1 |
| 2,210,848 | 8/1940 | Bohle | 29—95.1 |
| 2,439,422 | 4/1948 | Fear | 29—95.1 |
| 2,986,801 | 6/1961 | Mentley | 29—95.1 |
| 2,987,801 | 6/1961 | Psenka | 29—95.1 |
| 3,217,383 | 11/1965 | Psenka | 29—95.1 |
| 3,276,099 | 10/1966 | Psenka | 29—95.1 |

HARRISON L. HINSON, *Primary Examiner.*